US008395605B2

(12) United States Patent
Sisto et al.

(10) Patent No.: US 8,395,605 B2
(45) Date of Patent: Mar. 12, 2013

(54) MONITOR CHAINING AND DOCKING MECHANISM

(75) Inventors: John F. Sisto, Lynbrook, NY (US); Charles A. Forni, Setauket, NY (US)

(73) Assignee: SMSC Holdings S.a.r.l., Luxembourg (LU)

( * ) Notice: Subject to any disclaimer, the term of this patent is extended or adjusted under 35 U.S.C. 154(b) by 39 days.

(21) Appl. No.: 13/223,730

(22) Filed: Sep. 1, 2011

(65) Prior Publication Data

US 2012/0062800 A1     Mar. 15, 2012

Related U.S. Application Data

(60) Provisional application No. 61/381,698, filed on Sep. 10, 2010.

(51) Int. Cl.
G09G 5/00     (2006.01)
(52) U.S. Cl. .................................................. 345/204
(58) Field of Classification Search .............. 348/552, 348/660, 553; 345/204, 1.1, 98, 532, 519, 345/212; 370/535, 537; 341/257, 100, 101; 375/257; 250/214, 208.1
See application file for complete search history.

(56) References Cited

U.S. PATENT DOCUMENTS

| | | | | |
|---|---|---|---|---|
| 6,388,590 | B1 * | 5/2002 | Ng | 341/100 |
| 6,388,591 | B1 * | 5/2002 | Ng | 341/100 |
| 7,180,046 | B2 * | 2/2007 | Tinkler et al. | 250/214 R |
| 7,953,162 | B2 * | 5/2011 | Shetty | 375/257 |
| 8,040,334 | B2 * | 10/2011 | Kim | 345/204 |
| 8,175,173 | B2 * | 5/2012 | Shetty | 375/257 |
| 2007/0185379 | A1 * | 8/2007 | Newman et al. | 600/110 |
| 2008/0231578 | A1 * | 9/2008 | Johnson et al. | 345/98 |
| 2011/0025907 | A1 * | 2/2011 | Tsuda et al. | 348/372 |
| 2011/0157104 | A1 * | 6/2011 | Kang et al. | 345/204 |

FOREIGN PATENT DOCUMENTS

WO     2009/137061     11/2009

OTHER PUBLICATIONS

Introducing DisplayLink—Company Fact Sheet, Displaylink Technology Corp., updated Mar. 2008, 2 pages.
Toshiba Launches Affordable Universal Laptop Docking Station Link desktop accessories, an external monitor and sound systems to a laptop for increased productivity and multi-tasking ability, Press Release, 2010 Toshiba America Information Systems, Inc., 2 pages.
UFX6000/7000 USB Graphics Controllers—USB 2.0/3.0 Graphics Controllers—Featuring ViewSpan5G Technology, SMSC—Success by Design, 2010, 2 pages. International Search Report and Written Opinion in Application No. PCT/US2011/050208 dated Nov. 30, 2011, 14 pages.
STiDP880, iDP to LVDS converter—Data brief, Doc 10 16899 Rev 1, XP-002662502, Dec. 2009, 6 pages.
VESA DisplayPort Standard, Version 1.1, XP002486908, Mar. 19, 2007, 228 pages.

* cited by examiner

*Primary Examiner* — Paulos M Natnael
(74) *Attorney, Agent, or Firm* — Meyertons Hood Kivlin Kowert & Goetzel, P.C.; Jeffrey C. Hood; Mark S. Williams

(57) ABSTRACT

A circuit that supports multiple monitors, docking functions, and protected content via one cable. The circuit includes a receiver that receives multiple video streams, each including respective video data, a mux/demux, coupled to the receiver, that determines which video stream to display on a monitor, a low-voltage differential signaling (LVDS) converter, coupled to the mux/demux, that generates an LVDS signal based on the video data of the determined video stream, an LVDS serializer/deserializer, coupled to the LVDS converter, that generates a signal based on the LVDS signal and sends the signal to a display panel of the monitor for display, a transmitter coupled to the mux/demux, and a transmit physical interface (TPI) coupled to the transmitter. The mux/demux sends at least a remainder of the video streams to the transmitter, which sends them to the TPI, which transmits them as output, useable as input to further instances of the circuit.

33 Claims, 7 Drawing Sheets

MONITOR CHAINING AND DOCKING MECHANISM

CONTINUATION DATA

This application claims benefit of priority to U.S. Provisional Application 61/381,698, titled "Display Port Docking Mechanism", which was filed Sep. 10, 2010, whose inventors are John F. Sisto and Charles Forni, and which is hereby incorporated by reference in its entirety as though fully and completely set forth herein.

BACKGROUND OF THE INVENTION

1. Field of the Invention

This invention is related to computer systems, and more particularly, to a mechanism that supports multiple monitors, docking functions, and protected content via a single cable.

2. Description of the Related Art

Modern computer systems often include multiple monitors and other peripheral devices with corresponding communication requirements which may lead to a proliferation of cables that clutter the workspace and may complicate operation and maintenance of the system. Universal Serial Bus (USB) is currently a popular technology that allows both video and other functions to be transmitted over the same link. Such functionality may also be implemented via the well-known Ethernet protocol. For example, various products have been developed that allow connection of different types of display (e.g., monitors) via USB. Examples of products utilizing these technologies include the SMSC and DisplayLink™ family of integrated circuits (ICs), which are embedded into peripherals, monitors, or projectors, to facilitate graphics connectivity over USB, and Hewlett-Packard's Multipoint™ zero client products, as well as various USB Docking Station products provided by Hewlett-Packard, Toshiba, Lenovo, Kensington, etc.

However, USB based solutions entail a heavy CPU burden, and complex proprietary software generally must be developed and maintained across operating systems. Moreover, content protection is currently not supported. Gigabit Ethernet does not have sufficient bandwidth to support uncompressed video, and 10 Gigabit Ethernet is not currently cost effective. Additionally, compressed video may introduce visual artifacts when video is being displayed to the end user. Wireless technologies currently are also not suitable due to low bandwidth.

SUMMARY OF THE INVENTION

A system, e.g., a circuit such as an application specific integrated circuit (ASIC), and method of use are presented. The circuit may include a receiver that supports digital content protection, e.g., a DisplayPort (e.g., v1.2) receiver with High-Bandwidth Digital Content Protection (HDCP), although in other embodiments, other protocols than DisplayPort may be used as desired. The receiver may support multiple data lanes, e.g., up to 4 DisplayPort lanes, as well as an auxiliary channel. The source of the multiple data channels may be a graphics card of a host computer, i.e., a graphics processing unit (GPU), as opposed to the host computer's CPU, which is the data source in prior art solutions, such as those utilizing USB. Thus, this feature of the present approach offloads processing from the host CPU to the GPU, thereby significantly reducing overhead for the CPU.

The receiver may include or be coupled to a mux/demux (multiplexer/demultiplexer), also referred to as a mux/demux block or component, which may operate to receive a single (e.g., combined) signal from the receiver and provide multiple outputs, each of which may be selected by the demux for output. Note that depending on the particular functionality being discussed, the mux/demux may be referred to herein simply as a mux or a demux.

The receiver may also be coupled to a serial hub, e.g., a USB hub, e.g., a USB 2.0 or 3.0 hub, which may support serial connectivity to multiple peripheral devices or components, as well as Ethernet connectivity, e.g., via 10/100 Ethernet MAC, and 10/100 PHY components, as shown. The serial hub may further couple to an audio codec component via which the circuit may communicate with speakers and/or a microphone, as indicated.

The mux/demux may be coupled to a low-voltage differential signaling (LVDS) converter, a transmitter that supports digital content protection, such as a DisplayPort transmitter with HDCP, and an HDMI converter. LVDS is an electrical signaling system that operates via inexpensive twisted-pair copper cables. The LVDS converter block extracts audio stream(s) and, may pass them to a coupled audio codec component for communicating with speakers and/or a microphone. The LVDS converter may also couple to a dual channel LVDS serializer/deserializer (SerDes) that may operate to convert data between serial data and parallel interfaces for two data channels. The output may be provided to a monitor panel for display. Alternative to LVDS, an Embedded Display Port, eDP, or other type of interface may be used.

The transmitter may couple to a transmit physical interface, e.g., a DP++ PHY component, which may facilitate transmission of HDMI and/or DVI signals via the DisplayPort interface utilizing an external passive adapter. The HDMI converter receives signals from the mux/demux, converts the signals to HDMI, and provides the HDMI signals to the HDMI transmitter (with HDCP), which then provides the HDMI signals to the transmit physical interface, which in one embodiment is a DP++ PHY component. Thus, the DP++ PHY component may provide for outputting DisplayPort and/or HDMI/DVI signals. For example, in one embodiment, the DP++ PHY component may support transmission of a single HDMI or DVI channel, or multiple, e.g., up to 4, DisplayPort. In some embodiments, the circuit (i.e., the chip) may be integrated inside a display device, such as a computer monitor.

In some embodiments, the circuit may be used to implement a zero client. For example, the circuit may implement a zero client in a monitor (or, alternatively, in a separate device). The daisy chaining functionality of the circuit described above with respect to a multi-monitor computer system may also support the use of multiple zero clients daisy chained from a single host computer.

Additionally, in some embodiments, the graphics card of the host computer may include multiple Display Port interfaces, which may allow further zero clients to be served from the same host computer. In some embodiments, exposed serial ports, e.g., USB ports, may be provided on each zero client to support HID devices such a mouse, keyboard, and camera, among others, thus allowing respective users to access the host computer independently. As described above, built in HDCP for Display Port may enable content protection to be supported.

Thus, various embodiments of the circuit disclosed herein may be used to implement multi-display computer systems, and/or devices, e.g., zero client systems where multiple zero clients are served by a single host computer.

BRIEF DESCRIPTION OF THE DRAWINGS

Advantages of the present invention will become apparent to those skilled in the art with the benefit of the following detailed description and upon reference to the accompanying drawings in which.

Figure 1:
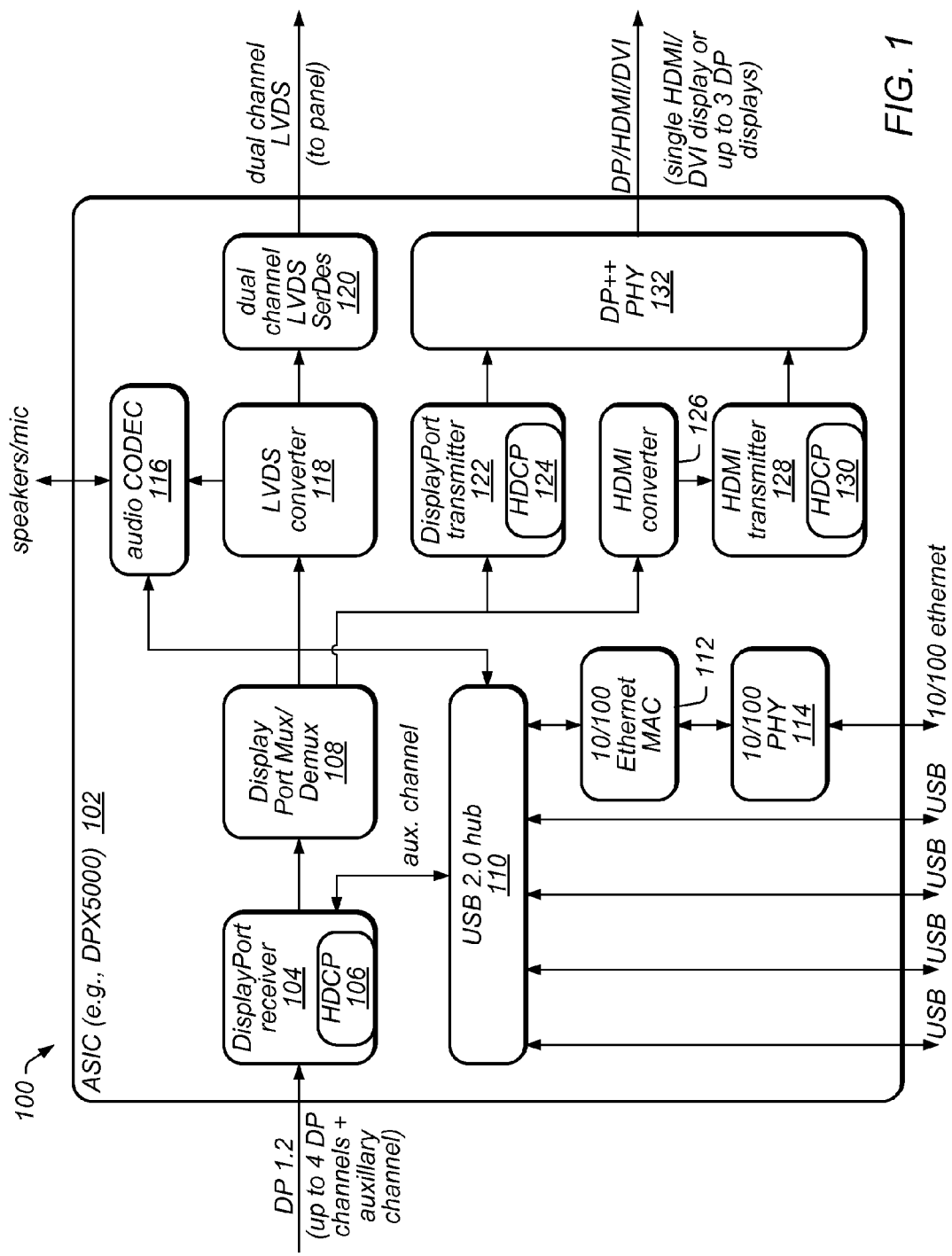
FIG. 1 is a high-level block diagram illustrating a circuit, e.g., an application specific integrated circuit (ASIC), according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements. A GUI may comprise a single window having one or more GUI Elements, or may comprise a plurality of individual GUI Elements (or individual windows each having one or more GUI Elements), wherein the individual GUI Elements or windows may optionally be tiled together.

Computer System—any of various types of computing or processing systems, including a personal computer system (PC), mainframe computer system, workstation, network appliance, Internet appliance, zero client, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DisplayPort is a digital display interface standard provided by the Video Electronics Standards Association (VESA) (since 2006), which defines a royalty-free, digital audio/video interconnect, intended to be used primarily between a computer and its display monitor, or a computer and a home-theater system. The DisplayPort standard is gaining substantial momentum in the PC industry to become the default video connector. For example, version 1.2 supports higher resolutions (than previous versions), up to four daisy chained monitors (1920×1200), and an 800 Mbps auxiliary channel.

Embodiments are disclosed herein of a system, which in some embodiments may be implemented as a circuit that supports multiple monitors, docking functions, and protected content via a single cable. Additionally, in some embodiments, docking functions normally handled by USB may be sent or received over an auxiliary channel, including, for example, functions for audio, human interface devices (HIDs), Ethernet, and so forth, among others. In various embodiments the circuit may be implemented as an application specific integrated circuit (ASIC), or programmable hardware, such as an FPGA, e.g., a chip. The circuit may implement or utilize the DisplayPort standard, although other protocols may be used as desired.

FIG. 1 is a block diagram illustrating an exemplary embodiment of the circuit 100. However, it should be noted that in other embodiments, different sets of components and/or arrangements and interconnectivity of the components may differ from those shown. In one exemplary embodiment, the circuit 100 may be implemented as an ASIC.

As FIG. 1 shows, in this embodiment, the circuit 100 may include a receiver 104 that supports digital content protection 106, e.g., a DisplayPort (e.g., v1.2) receiver with High-Bandwidth Digital Content Protection (HDCP), although, as noted above, in other embodiments, other protocols than DisplayPort may be used as desired. The receiver 104 may support multiple data lanes. For example, the DisplayPort-based embodiment of FIG. 1 may support up to 4 DisplayPort lanes, as well as an auxiliary channel. Note that the source of the multiple data lanes may be a graphics card of a host computer, i.e., a graphics processing unit (GPU), as opposed to the host computer's CPU, which is the data source in prior art solutions, such as those utilizing USB. Thus, this feature of the present approach offloads processing from the host CPU to the GPU, thereby significantly reducing overhead for the CPU.

The receiver 104 may be coupled to a mux/demux, e.g., Display Port mux/demux 108, also referred to as a mux/demux block or component, which may operate to receive a single (e.g., combined) signal from the receiver and provide multiple outputs, each of which may be selected by the mux/demux for output. The receiver may also be coupled to a serial hub, e.g., USB hub 110, e.g., a USB 2.0 hub (or other version), which may support USB connectivity to multiple USB devices or components, as well as network, e.g., Ethernet, connectivity, e.g., via 10/100 Ethernet MAC, and 10/100 PHY components, as shown. The USB hub 110 may further couple to an audio codec component 116 via which the circuit may communicate with speakers and/or a microphone, as indicated.

As FIG. 1 also indicates, the mux/demux 108 may be coupled to a low-voltage differential signaling (LVDS) converter 118, a transmitter 122 that supports digital content protection 124, such as a DisplayPort transmitter with HDCP, and an HDMI converter 126. The LVDS converter 118 may couple to the audio codec component 116 for communicating with speakers and/or a microphone. The LVDS converter 116 may also couple to a dual channel LVDS serializer/deserializer (SerDes) 120 that may operate to convert data between serial data and parallel interfaces for two data channels. As shown, this output may be provided to a monitor panel for display. Alternative to LVDS, an Embedded Display Port, eDP, or other type of interface may be used.

As further shown, the transmitter 122 may couple to a transmit physical interface 132, e.g., a DP++ PHY component, which may facilitate transmission of HDMI and/or DVI signals via DisplayPort wires, as further indicated by HDMI converter 126 and transmitter 128 (with HDCP 130), where the HDMI converter 126 receives signals from the mux/demux 108, converts the signals to HDMI, and provides the HDMI signals to the HDMI transmitter 128, which then provides the HDMI signals to the transmit physical interface 132, which in this embodiment is the DP++ PHY component 132. Thus, the DP++ PHY component 132 may provide for outputting DisplayPort and/or HDMI/DVI signals. For example, in one embodiment, the DP++ PHY component may support transmission of a single HDMI or DVI channel, or multiple, e.g., up to 4, DisplayPort lanes (or video streams).

In some embodiments, the system, e.g., the circuit (e.g., the chip) 100 may be integrated inside a display device, such as a computer monitor, as will be described in more detail below; however, in other embodiments, the circuit (or generically, the system) may be implemented in or as a separate device that couples to a monitor.

Figure 2:
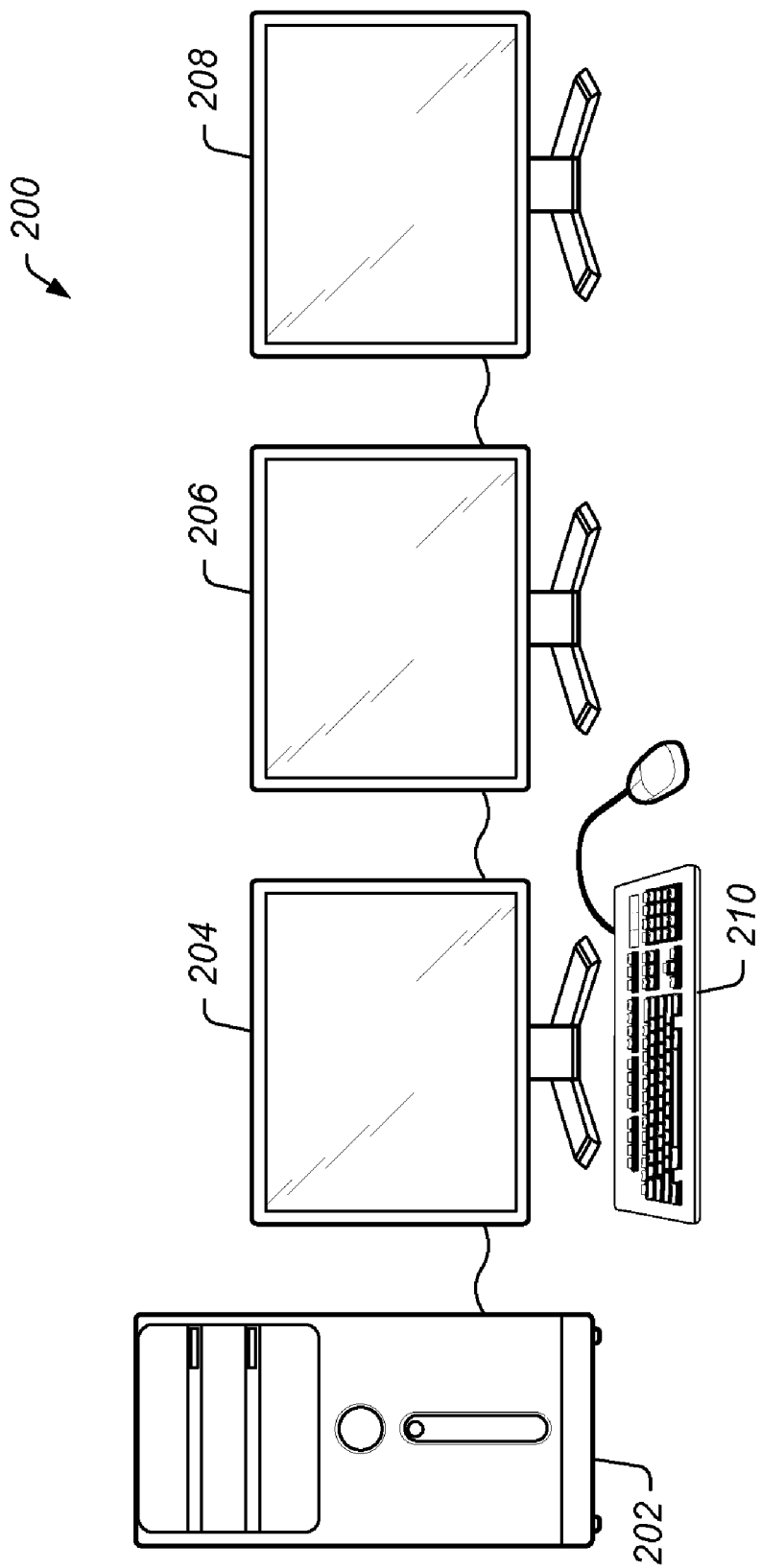
FIG. 2 illustrates an exemplary computer system with multiple monitors, according to one embodiment.

FIG. 2 illustrates an exemplary computer system 200 that includes a computer 202 and multiple monitors 204, 206, and 208, according to one embodiment. In some embodiments, each of the monitors includes a system, e.g., a circuit, 100 in accordance with the present invention. As shown, the computer 202 may be communicatively coupled to a first monitor 204 (of the multiple monitors) via a single cable. Each additional monitor (e.g., 206 and 208) may be "daisy chained" from the first monitor 204, with a respective single cable coupling each successive pair of monitors. In other embodiments, each monitor may be coupled to a respective system, i.e., a respective instance of the system (e.g., circuit). Note that the term "circuit" may be used herein to refer to the system, but is intended to refer to any physical implementations with the described functionality.

Figure 3:
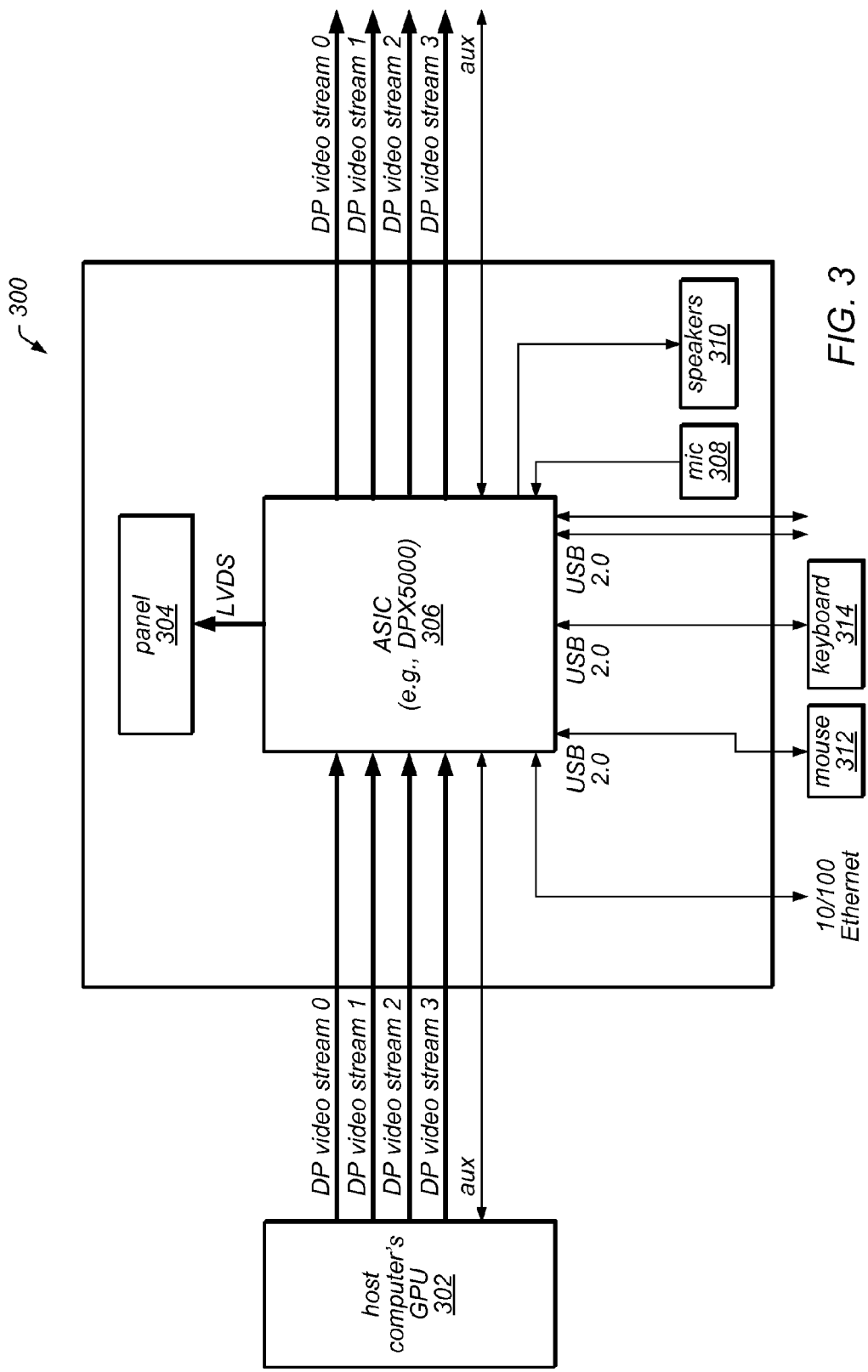
FIG. 3 is an exemplary block diagram of a monitor, according to one embodiment.

FIG. 3 is a high-level block diagram of an exemplary component layout of a monitor 300, according to one embodiment. As FIG. 3 shows, the monitor may include a circuit 306, which in the exemplary embodiment shown is an ASIC, such as an SMSC DPX5000 chip. The circuit may be configured to receive input from a host computer's GPU 302, in this case, (up to) four video streams of data (e.g., DisplayPort video streams DP video streams 0 through 3), which may also be referred to as data lanes, and an auxiliary channel (aux). As shown, the circuit 306 may couple to display panel 304 of the monitor via the LVDS whereby video from one of the video streams may be displayed.

As also shown, in one embodiment, the circuit may provide up to four video streams of data plus the auxiliary channel as output, e.g., to subsequent monitors daisy chained to the monitor 300 (each with a respective instance of the circuit described herein). Note that in some embodiments, the output data may be the input data minus the video stream extracted for display on the monitor 300. In other words, as described above with reference to FIG. 1, the mux/demux 108 of the circuit may extract a video stream from the input data for display on the monitor panel (304), and send at least the remainder of the data as output. Note, however, that in some embodiments, all of the video streams may be provided as output, including the video stream extracted for display on the monitor. In other words, all of the video streams (plus aux) may be passed on to each of the monitors in the chain. Moreover, in embodiments where auxiliary data are also included in the video streams, the auxiliary data (or a portion of the auxiliary data) may also be passed on to downstream monitor(s) (and/or respective circuits).

As FIG. 3 also indicates, the circuit 306 may also communicate with serial, e.g., USB, peripheral devices, such as mouse 312 and keyboard 314, as well as 10/100 Ethernet devices. The circuit 306 may further communicate audio signals to or from mic 308 and speakers 310 (e.g., via audio codec), which in this embodiment, are shown built into the monitor.

Figure 4:
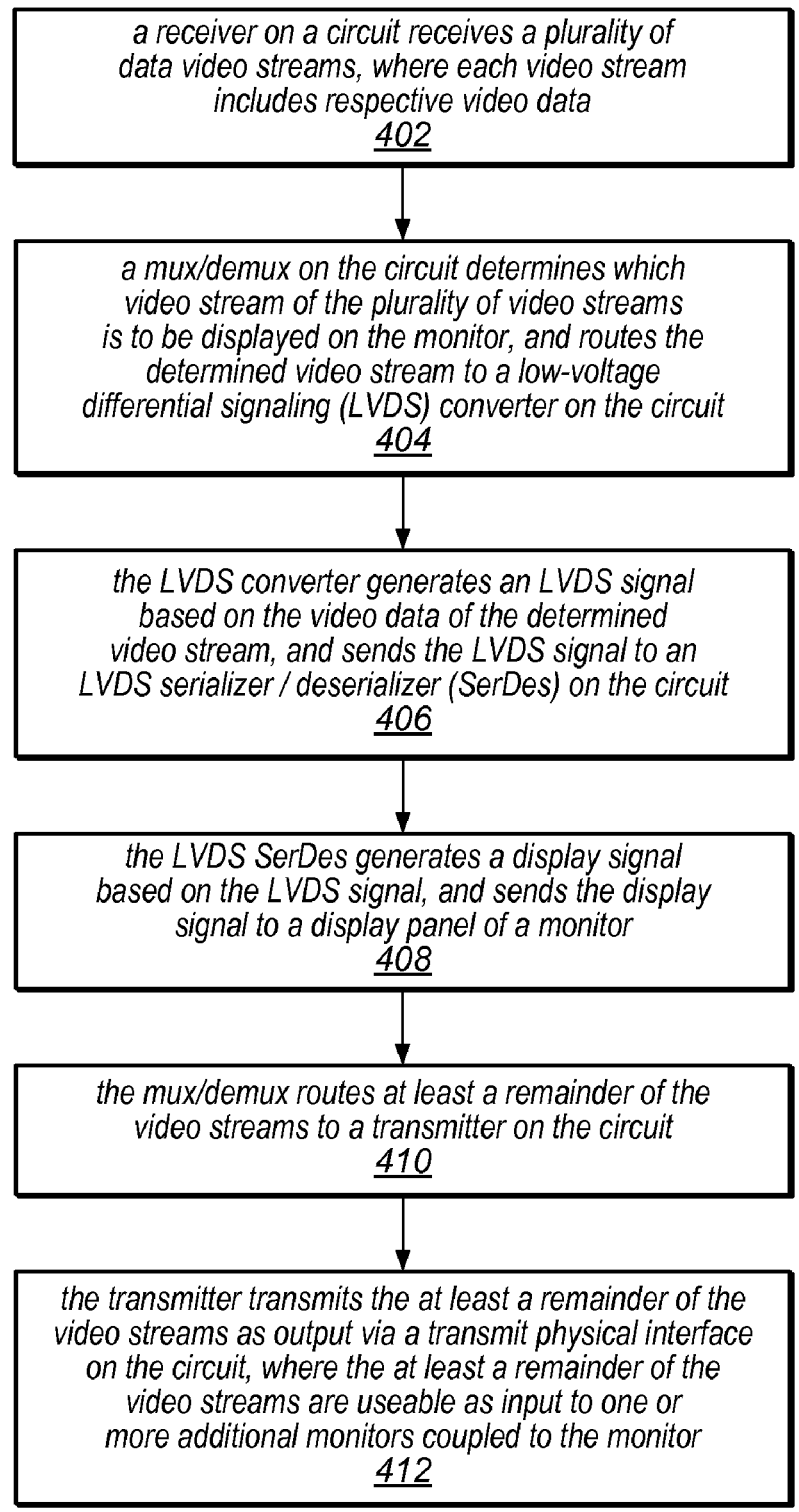
FIG. 4 illustrates one embodiment of a method for handling video signals in a monitor via a circuit.

FIG. 4 illustrates a method for handling video signals in a monitor via a system, e.g., a circuit, according to one exemplary embodiment. The method shown in FIG. 4 may be used in conjunction with any of the computer systems or devices shown in the Figures, among other devices. In various embodiments, some of the method elements shown may be performed concurrently, in a different order than shown, or may be omitted. Additional method elements may also be performed as desired. As shown, this method may operate as follows.

First, in 402, a plurality of video streams, e.g., up to four video streams, may be received on a receiver of the circuit, e.g., on the DisplayPort receiver 104 (see, FIG. 1) that is included in a monitor, such as, for example, the first monitor 204 of FIG. 2. Each video stream may be capable of supporting a 1920×1200 monitor, although other resolutions may be used as desired. If content protection is enabled, the HDCP engine in the receiver may decrypt the respective video stream(s), e.g., the video data. Of course, in other embodiments, other engines or means may be used to decrypt the video streams.

In 404, the mux/demux may determine which video stream is to be terminated in the monitor. In other words, the mux/demux may determine which video stream of video data is to be displayed on the present monitor. The determined video stream (of video data) may be routed to the LVDS converter. Note that alternatives to LVDS may be used as desired.

In 406, the LVDS converter may send the video data (of the determined video stream) to the LVDS SerDes which may be capable of directly controlling the monitor's (display) panel.

In 408, if audio data are included in the video stream, the audio data are extracted and sent to the audio codec component. In one embodiment, the audio codec component may connect to speakers and/or a microphone embedded in the monitor, although in other embodiments, the speakers and/or microphone may be external to the monitor.

In 410, the other (e.g., up to) four video streams, e.g., all or a remainder of the video streams, if present, may be routed to the transmitter, e.g., the DisplayPort transmitter;

In 412, the transmitter may then transmit the remainder of the video streams as output via the transmit physical interface, e.g., the DP++ PHY. In some embodiments, the transmit physical interface (e.g., the DP++ PHY) may be daisy chained to a second monitor that also includes a circuit according to the present invention. Similarly, the second monitor may be chained to a third such monitor, and the third monitor to a fourth, as desired. Thus, the circuit may operate to extract one of the video streams for display on the monitor send the remainder of the video streams (if any) as output for display by one or more subsequent monitors daisy chained to the monitor.

Note that if content protection is required (and enabled) the video streams may be encrypted, e.g., using HDCP, e.g., via the HDCP components of the DisplayPort and HDMI transmitters.

As noted above, due to the Display Port PHY dual functions of HDMI/DVI, in some embodiments, instead of supporting (up to) three DisplayPort video streams, the user may opt to support a single HDMI/DVI port.

While the above described embodiment of the method of FIG. 4 is particularly directed to DisplayPort (or other display protocol) and HDMI/DVI functionality of the circuit, in some embodiments, additional functionality, e.g., hub or docking functionality, is also an important feature. For example, in some embodiments, the signal further includes auxiliary data, where the auxiliary data includes non-video data. Thus, as described above with reference to FIG. 1, in some embodiments, the circuit may also include an auxiliary channel, and moreover, a serial hub, e.g., a USB (e.g., 2.0 or 3.0) hub may be integrated in the circuit, and may connect to the auxiliary channel. The auxiliary channel may be configured to provide a shim layer for transmitting and receiving USB traffic.

More specifically, the serial (e.g., USB) hub may provide support for various (e.g., USB) human interface devices (HIDs), such as a mouse, keyboard, touch sense, or camera, among others, and may also provide support for an (e.g., USB) audio device by controlling the embedded audio codec. Moreover, as also indicated in FIG. 1, the hub may also support an Ethernet port or other network interface, which may be particularly useful if the host computer is a small form factor netbook which does not provide a 10/100 port.

Thus, the method may also include an auxiliary channel, coupled to or included in the receiver, sending or receiving the auxiliary data to a serial hub, coupled to the receiver via the auxiliary channel, and the serial hub providing serial I/O for peripheral device or network communications via the auxiliary channel. As also indicated above, in some embodiments, the method may include communicating, via an audio codec coupled to the serial hub, audio data with a microphone or speakers. Thus, the serial hub may provide docking functions including one or more of: audio functions, functions for human interface devices (HIDs), or functions for network communications.

More generally, summarizing the above, in some embodiments, the method described above with reference to FIG. 4 may be performed by a first instance of a circuit (which may be referred to as a system) that is includable in (or connectable to) the first monitor, where further instances of the circuit are includable in (or connectable to) each of the one or more additional monitors. The instances of the circuit may be daisy chainable. Each instance of the circuit may be useable to receive at least a subset of the plurality of video streams, extract and display a video stream from the at least a subset of the plurality of video streams on a respective monitor, and transmit at least a remainder of the at least a subset of the plurality of video streams as output to another of the instances of the circuit.

Thus, for example, in one embodiment, each instance of the system may further include an auxiliary channel, coupled to or included in the receiver, where the signal further includes auxiliary data that includes non-video data. The auxiliary channel may be configured to send or receive the auxiliary data, e.g., to provide for communication between the system and the host computer (or upstream instances of the system). Each instance of the system may further include a serial hub, coupled to the receiver via the auxiliary channel. The serial hub may be configured to provide serial I/O for one or more peripheral devices coupled to the serial hub.

In some embodiments, when the instances of the system are daisy chained (e.g., when devices, such as monitors or zero client devices that include such instances are daisy chained), the instances may implement a sequential tiered star topology. Moreover, via embodiments of the techniques disclosed herein, a first video stream of the plurality of video streams may be associated with the serial hub of the first instance of the system (circuit), and successive video streams of the plurality of video streams may be respectively associated with the serial hubs of the further instances of the system in a sequential manner, thereby associating each video stream with the one or more serial peripheral devices respectively coupled to each serial hub.

As noted above, in some embodiments, at least a remainder of the video streams includes (all of) the plurality of video streams, and may further include auxiliary (e.g., non-video) data. Alternatively, in other embodiment, the at least a remainder of the video streams may be a subset of the plurality of video streams.

Zero Clients

In some embodiments, the circuit may be used to implement a zero client. For example, the circuit may implement a zero client in a monitor (or, alternatively, in a separate device). The daisy chaining functionality of the circuit described above with respect to a multi-monitor computer system may also support the use of multiple zero clients daisy chained from a single host computer.

Figure 5:
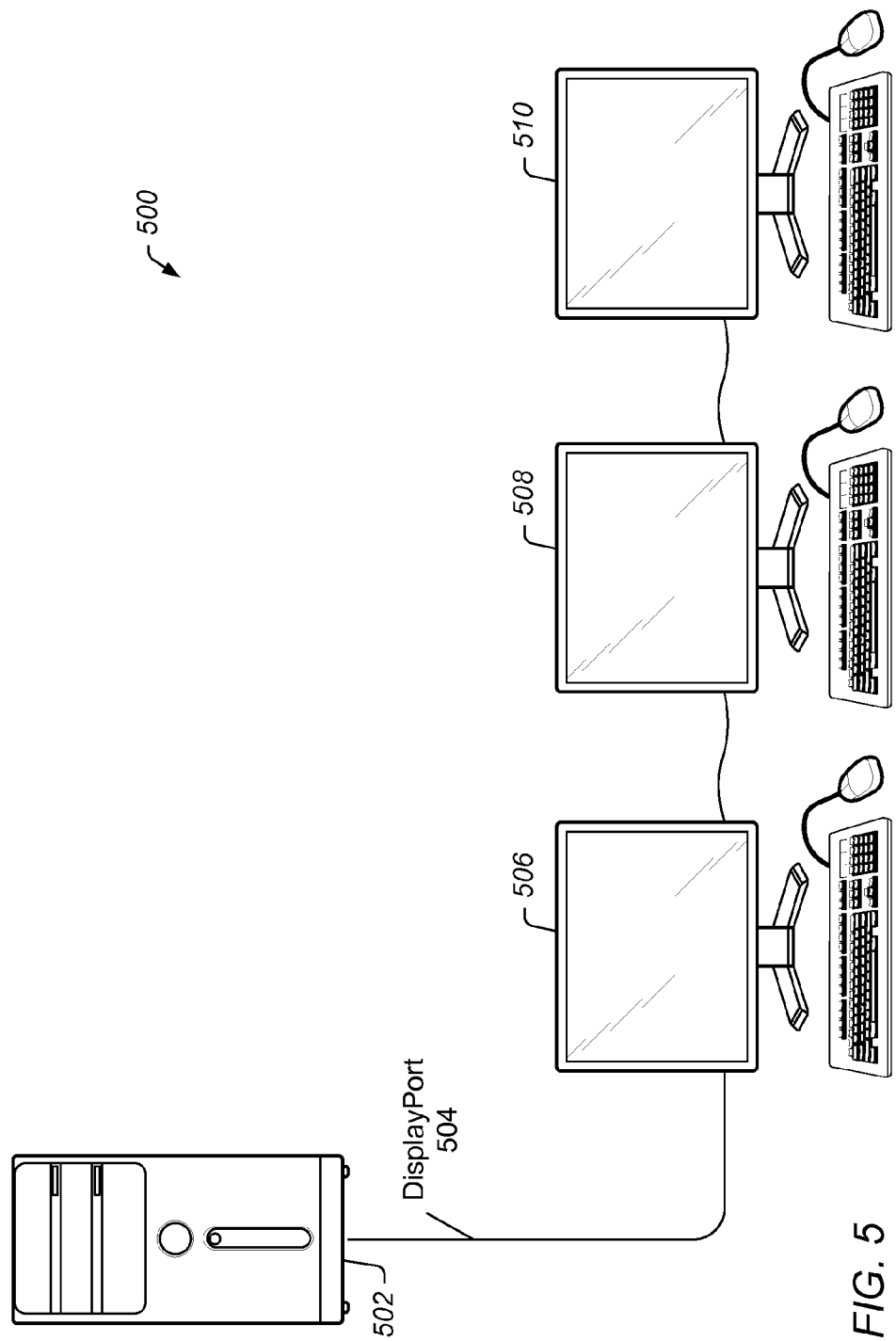
FIG. 5 illustrates an exemplary zero client system with multiple zero clients served by a single host computer, according to one embodiment.

FIG. 5 illustrates one embodiment of such a system, where a host computer 502 serves a plurality of zero clients 506, 508, and 510, implemented in respective monitors via an embodiment of the circuit disclosed herein. As FIG. 5 shows, the host computer 502 may be communicatively coupled to a first zero client 506, e.g., over a DisplayPort wired connection or another high bandwidth connection such as Thundebolt or wired PCIe.

As indicated, one or more successive zero clients, e.g., zero clients 508 and 510, may be daisy chained from the zero zero client 506. Note that in DisplayPort (v1.2) based embodiments, up to four zero clients may be chained from a single host computer. Said another way, the architecture disclosed herein may enable up to four zero clients to be daisy chained together via Display Port connectors. Note that such clients are referred to as "zero" due to the absence of a CPU, i.e., processing is performed by the host computer where the Display Port interfaces originate.

Figure 6:
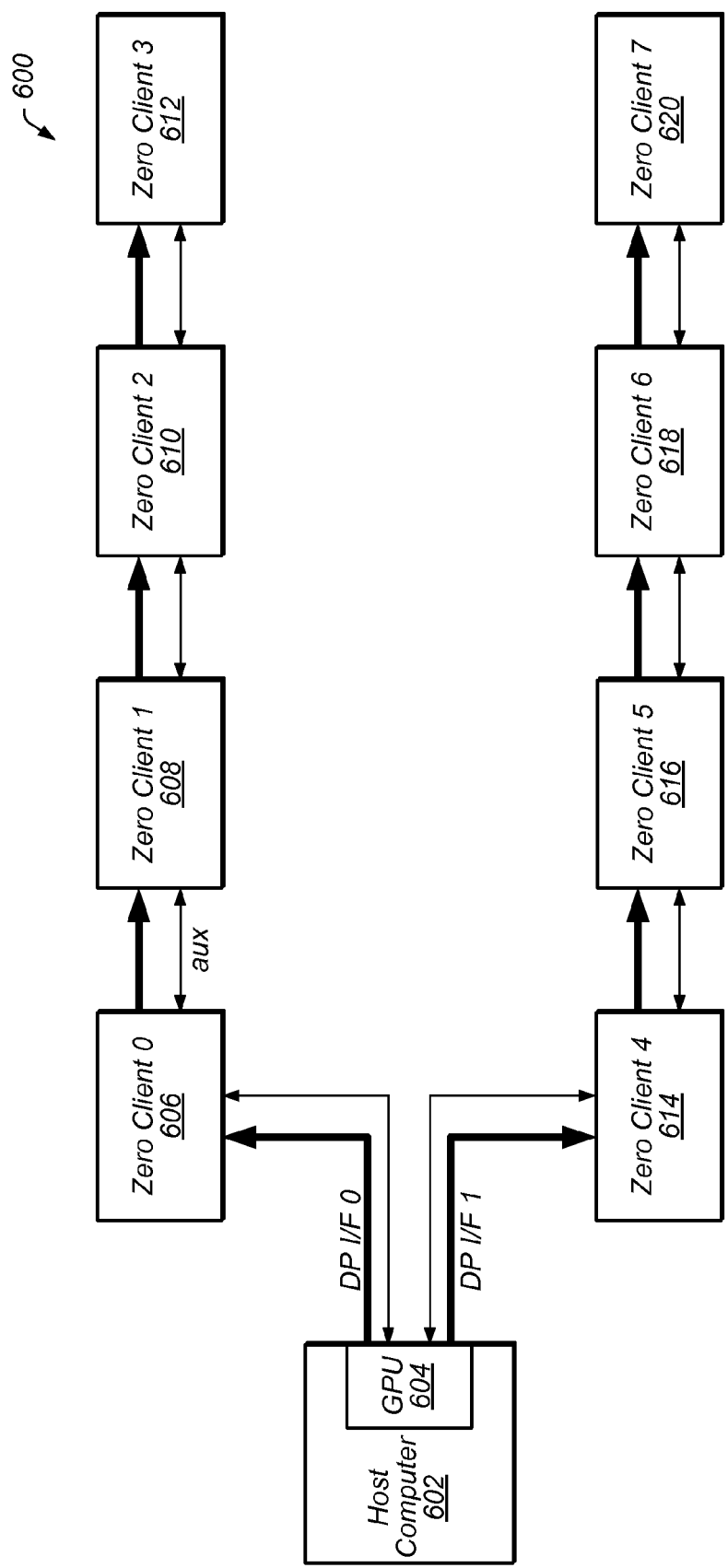
FIG. 6 is an exemplary block diagram of a zero client system in which a single host computer with two display ports serves two chains of zero clients, according to one embodiment.

Additionally, in some embodiments, the graphics card of the host computer may include multiple Display Port interfaces, which may allow further zerp clients to be served from the same host computer, as shown in FIG. 6, described below. In some embodiments, exposed USB ports may be provided on each zero client to support HID devices such a mouse, keyboard, and camera, among others, thus allowing respective users to access the host computer independently. As described above, built in HDCP for Display Port enables content protection to be supported.

FIG. 6 is a high-level block diagram illustrating an exemplary zero client system 600, according to one embodiment. As may be seen, in this embodiment, host computer 602 includes a GPU 604, which includes two display ports, specifically, two DisplayPort interfaces (DP I/F 0 and DP I/F 1), where DP I/F 0 couples to a first zero client 0 (606), from which are daisy chained three additional zero clients, specifically, zero client 1 (608), zero client 2 (610), and zero client 3 (612), each of which may include a circuit, as disclosed herein. Thus, per the above-described techniques, the first zero client 606 may extract a respective video stream (or lane/channel) for display from the multiple video streams provided by the host computer's GPU, and send (at least) the remainder of the video streams (and aux) to the next zero client 608, which extracts its respective video stream for display, and passes on (at least) the remainder of the video streams (which may include one less video stream than the received remainder of video streams) to the next zero client 610, and so on, to zero client 3 612. Note that the last zero client in the chain, in this case, zero client 612, has no further zero client to send any remainder to, and may have no remainder of video streams to send, if all data have been displayed.

As noted above, in some embodiments, rather than supporting multiple downstream zero clients, the first zero client in a chain may output a single HDMI/DVI signal to an appropriate HCMI/DVI device.

As FIG. 6 also shows, in this embodiment, the zero client system 600 also includes a second, similar, chain of zero clients, specifically, zero client 4 (614), coupled to the second DisplayPort interface DP I/F 1, and zero client 5 (616), zero client 6 (618), and zero client 7 (620), daisy chained from zero client 4 (614). This chain operates in a similar manner as the first chain of zero clients, discussed above.

Thus, various embodiments of the circuit disclosed herein may be used to implement zero client systems. More particularly, embodiments of the novel architectures and techniques described herein may utilize DisplayPort to implement zero clients.

It should be noted that while the embodiments of zero clients described above embed the circuit in the monitors, in other embodiments, the circuit may be external to the monitor, e.g., may be embedded in a zero client chassis coupled to the monitor.

Thus, in various embodiments, the circuit may be used to implement multi-monitor computer systems, as well as chained zero client systems. As discussed above, prior art approaches to these systems generally require significant software overhead and maintenance, and do not support content protection. In contrast, DisplayPort, which does support content protection, is currently supported by most major operating systems, and due to such native support for this interface (protocol), a limited amount of software support is required.

Furthermore, in the embodiments disclosed herein, much of the processing is offloaded to the (host) computer's graphics processing unit (GPU), and so there is minimal overhead on the CPU. This is in contrast with prior art solutions, such as USB, which require substantial CPU bandwidth.

Generalizing and summarizing the above, in some embodiments, a system may be provided that includes two or more daisy chained monitors. Each monitor may include (or be coupled to) a respective circuit that includes a receiver, configured to receive a signal comprising a plurality of video streams, where each video stream comprises respective video data. Each circuit may further include a mux/demux, coupled to the receiver, and configured to determine which video stream of the plurality of video streams is to be displayed on a first monitor. The circuit may also include a low-voltage differential signaling (LVDS) converter, coupled to the mux/demux, and configured to generate an LVDS signal based on the video data of the determined video stream, as well as an LVDS serializer/deserializer (SerDes), coupled to the LVDS converter, and configured to generate a display signal based on the LVDS signal and send the display signal to a display panel of the first monitor. The circuit may further include a transmitter, coupled to the mux/demux, and a transmit physical interface, coupled to the transmitter. The mux/demux may be further configured to send at least a remainder of the video streams of the plurality of video streams to the transmitter, and the transmitter may be configured to send the at least a remainder of the video streams to the transmit physical interface, which may be configured to transmit the at least a remainder of the video streams as output. As explained above in detail, the at least a remainder of the video streams (which may include auxiliary data) may then be useable as input to one or more additional monitors coupled to the first monitor.

A first monitor of the two or more monitors may be coupled to a computer, and the circuit of the first monitor may be configured to: receive the plurality of video streams from the computer, extract and display a first video stream of the plurality of video streams, and transmit at least a remainder of the plurality of video streams to a second monitor of the two or more monitors. The circuit of the second monitor may be configured to: receive at least a remainder of the plurality of video streams from the circuit of the first monitor, and extract and display a second video stream of the plurality of video streams. The circuit of the second monitor may be useable to transmit another at least a remainder of the plurality of video streams to respective circuits of one or more further monitors in a daisy chain manner. In other words, each monitor (or circuit) in the daisy chain may select and extract a video stream (possibly including auxiliary data) from multiple video streams for display, and then pass some or all of the video streams to the next monitor (or circuit) in the chain.

Figure 7:
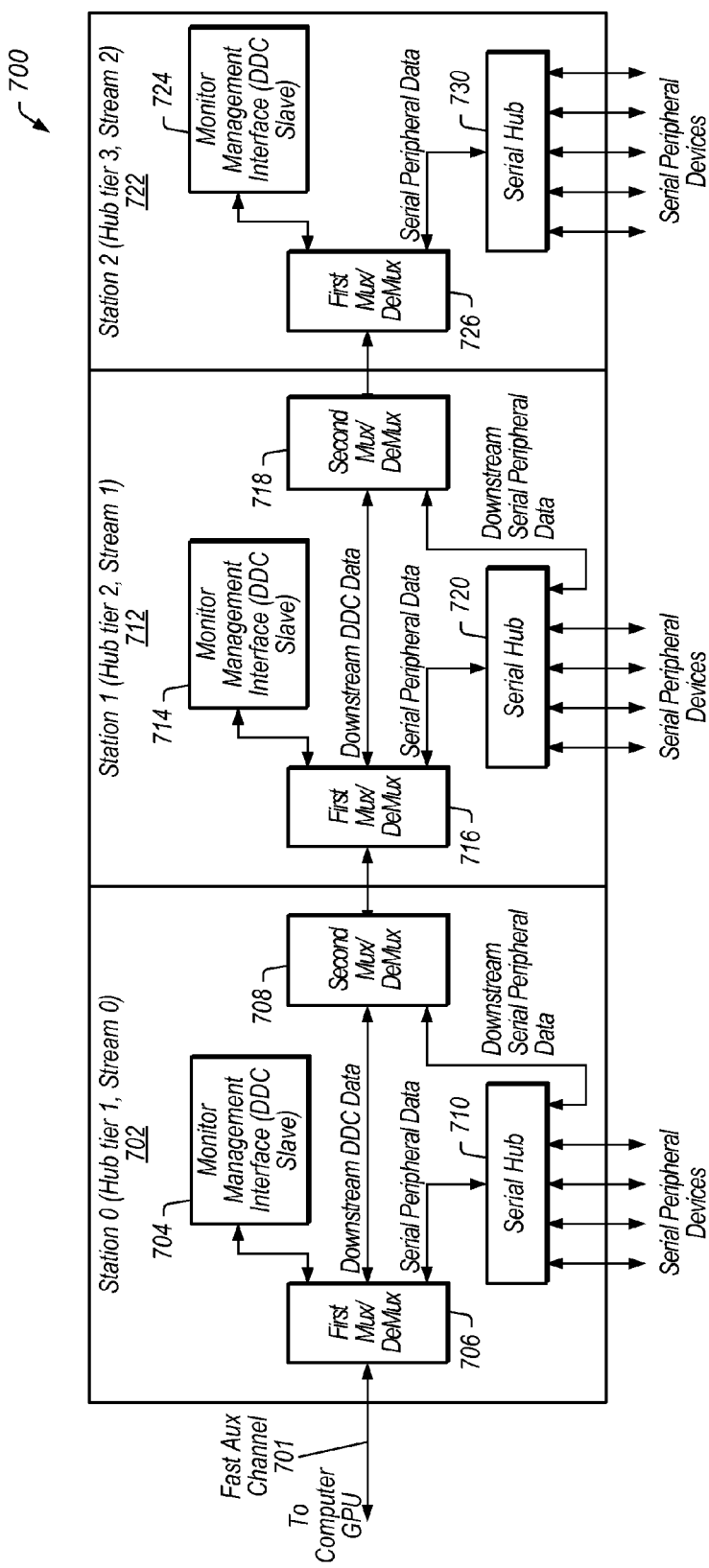
FIG. 7 illustrates a chain of devices that communicate with a host computer, according to one embodiment.

FIG. 7 illustrates a chain of devices, e.g., zero clients, configured to communicate with a host computer and each other via the techniques disclosed herein, according to one embodiment. The exemplary embodiment shown may implement or facilitate aggregation and/or encapsulation of serial peripheral device traffic (e.g., USB peripheral traffic) over a (fast) auxiliary channel via mux/demuxes (e.g., modules) via multiple (sequential) tiers of serial hubs, e.g., USB hubs, and in some embodiments, monitor management information may also be aggregated and/or encapsulated in the auxiliary channel. Moreover, the exemplary system of FIG. 7 further illustrates how video streams may be associated with such a serial hubs, e.g., in a sequential tiered architecture/topology.

At a high level, at least one device in the system of FIG. 7 may be configured to receive data on an auxiliary channel, pull peripheral data for that device's peripheral devices, and management information for that device's display (monitor), and send at least a portion of the received data to downstream devices. As FIG. 7 indicates, such data transmission can also be in the other direction. In other words, in some embodiments, in addition to sending data downstream (after reading desired data from the stream), the device(s) may be configured to receive data from downstream devices, optionally read select data from the stream, and send at least a portion of the data upstream, e.g., to another device or a host computer.

As may be seen, in the exemplary embodiment of FIG. 7, three devices, e.g., zero clients, labeled Station 0, Station 1, and Station 2, respectively, are communicatively chained together. Each device communicates with its neighbor(s) via respective mux/demuxes, specifically, first mux/demuxes and/or second mux/demuxes. Note that Station 2 does not show a second mux/demux, since there are no further downstream devices, although in some embodiments, this device, too, may include a respective second mux/demux.

The device labeled Station 0 (i.e., device 702) will now be described, although it should be noted that the description generally applies respectively to the other two devices, as well (Stations 1 and 2), and further, that the devices of FIG. 7 are meant to be exemplary only, and are not intended to limit the device(s) contemplated to any particular set of components, arrangement, or functionality.

As shown, device 702 may include a serial hub, e.g., a USB hub 710, which may be configured to communicate with one or more peripheral devices, e.g., USB peripherals. The device 702 may further include a first mux/demux 706 and a second mux/demux 708, coupled to each other and to the serial hub 710. The first mux/demux 706 may also be configured to couple to an auxiliary channel 701, which may facilitate communication with a host device (or other device, such as an upstream station or zero client), e.g., a graphics processing unit (GPU) of a personal computer (PC). The first mux/demux may further couple to a monitor management interface 704, shown in FIG. 7 as a monitor DDC (Device Discovery and Control) slave, which may be configured to communicate management information regarding a monitor included in or associated with the device 702. In one embodiment, the management information may include Extended Display Indentification Data (EDID), such as manufacturer, resolution, product code, etc., among other monitor attributes.

Thus, the aux channel 701 may provide management information for monitors, and peripheral data for serial peripheral devices.

In the context of the above-described devices of FIGS. 1-3, in some embodiments the first and second mux/demuxes (706/708, 716/718, 726) of device 701 may be in addition to, and distinct from, the mux/demux 108, described with reference to FIGS. 1, 2, and 3, which handles video data. Thus, these mux/demuxes may be considered second and third mux/demuxes when considered with (first) mux/demux 108. However, since the mux/demux 108 is not shown or integral to FIG. 7, the mux/demux pairs of the devices of FIG. 7 will be referred to below as first and second mux/demuxes (for each device) for convenience and clarity. The first mux/demux may be included in a receiver of the device (not shown in FIG. 7, but described above), along with the monitor management interface 704.

The first mux/demux 706 may be configured to communicate the auxiliary data with the auxiliary channel (which in term may communicate the data with the host computer or other device). The auxiliary data may include serial I/O for peripheral devices (i.e., serial peripheral data) and management information for one or more monitors (i.e., monitor management information), including first management information for a monitor included in or associated with the device, e.g., the first monitor 204 discussed above. The first mux/demux 706 may be further configured to communicate the serial I/O for peripheral devices with the serial hub, and to communicate the first management information with the monitor management interface, where the first management information includes values for attributes of the first monitor, e.g., EDID. The monitor management interface may be configured to communicate the first management information with the first monitor. The serial hub may be configured to communicate the serial I/O for peripheral devices with the auxiliary channel and one or more peripheral devices, e.g., coupled to the serial hub, as shown in FIG. 7.

Thus, the various components shown in device 702 may operate collectively to provide communication paths for monitor management and serial peripherals (e.g., human interface devices (HIDs), whereby attributes of the first monitor 204 (not shown) may be retrieved and/or set, and peripheral device data communicated with the host computer or device. In other words, auxiliary data that includes both monitor management information and peripheral device data, i.e., serial I/O for peripheral devices, may be sent and/or received to/from the host computer/device, and further, the monitor management information may be directed (by the first mux/demux 706) to/from the monitor management interface 704 (which may be coupled to the first monitor), and the serial I/O for peripheral devices may be directed (by the first mux/demux 706) to/from the serial hub 710 for provision to serial peripheral devices coupled thereto, as shown.

In some embodiments, communication of such auxiliary data with one or more downstream devices may also be supported. For example, as FIG. 7 shows, in some embodiments, the first mux/demux 706 may communicate downstream management information, e.g., downstream DDC data, with the second mux/demux 708. Similarly, serial hub 710 may communicate downstream serial peripheral data with the second mux/demux 708. Thus, the second mux/demux 708 may facilitate communications between the device 702 and one or more downstream devices, and thereby facilitate communications between such downstream devices and the host computer/device.

More specifically, in one embodiment, the second mux/demux 708 may be configured to communicate the management information for one or more monitors with the second mux/demux and downstream devices coupled to the device 702, and further, to communicate the serial I/O for peripheral devices with the serial hub and the downstream devices coupled to the device 702.

Note that device 712 (Station 1) includes analogous components with the same or similar functionality, including first mux/demux 716 (which may receive auxiliary data from device 702's second mux/demux 708) and second mux/demux 718, coupled to the first mux/demux 716, serial hub 720, coupled to first mux/demux 716 and second mux/demux 718, as well as respective serial peripheral devices, and monitor management interface 714, coupled to the first mux/demux 716.

Similarly, device 722 (Station 2) includes first mux/demux 726 (which may receive auxiliary data from device 712's second mux/demux 718) (but no second mux/demux, as mentioned above), serial hub 730, coupled to first mux/demux 726, as well as respective serial peripheral devices, and monitor management interface 724, coupled to the first mux/demux 726.

Each such device may be configured to communicate auxiliary information to and from upstream devices and downstream devices (except, of course, for the last device in the chain), providing portions of the auxiliary data as appropriate to its respective serial peripheral devices and monitor management interface, and feeding the auxiliary data (possibly augmented or reduced) to the upstream and/or downstream devices, e.g., for further processing.

Thus, embodiments of the above device(s) or systems may implement or provide for communications over a fast auxiliary channel regarding monitor management information and serial peripherals between the host computer and one or more devices, e.g., zero client devices, chained from the host device, as shown in FIG. 7. This functionality, in combination with the video stream related functionality described above, may associate video streams (e.g., DisplayPort streams) with serial hubs, which in turn may couple displays, e.g., monitors, and serial hubs with connected serial peripheral devices, e.g., HIDs. For example, following the exemplary embodiment of FIG. 7, in one embodiment, Station 0 and a video stream, e.g., stream 0, may be associated with serial hub 710 at a first tier, Station 1 and another video stream, e.g., stream 1, may be associated with serial hub 720 at a second tier, and Station 2 and yet another video stream, e.g., stream 3, may be associated with serial hub 730 at a third tier, where the tiers relate to the tiered topology of the serial bus system disclosed herein. In other words, the chained devices (with their respective serial hubs), implement a sequential tiered star topology, as discussed above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a receiver, configured to receive a signal comprising a plurality of video streams, wherein each video stream comprises respective video data;
   a first mux/demux, coupled to the receiver, wherein the first mux/demux is configured to determine which video stream of the plurality of video streams is to be displayed on a first monitor;
   a low-voltage differential signaling (LVDS) converter, coupled to the first mux/demux, wherein the LVDS converter is configured to generate an LVDS signal based on the video data of the determined video stream;
   an LVDS serializer/deserializer (SerDes), coupled to the LVDS converter, wherein the SerDes is configured to generate a display signal based on the LVDS signal and send the display signal to a display panel of the first monitor;
   a transmitter, coupled to the first mux/demux; and
   a transmit physical interface, coupled to the transmitter, wherein the first mux/demux is further configured to send at least a remainder of the video streams of the plurality of video streams to the transmitter, wherein the transmitter is configured to send the at least a remainder of the video streams to the transmit physical interface, and wherein the transmit physical interface is configured to transmit the at least a remainder of the video streams as output, wherein the at least a remainder of the video streams are useable as input to one or more additional monitors coupled to the first monitor.

2. The system of claim 1, wherein a first instance of the system is includable in the first monitor, wherein further instances of the system are includable in each of the one or more additional monitors, wherein the instances of the system are daisy chainable, and wherein each instance of the system is useable to receive at least a subset of the plurality of video streams, extract and display a video stream from the at least a subset of the plurality of video streams on a respective monitor, and transmit at least a remainder of the at least a subset of the plurality of video streams as output to another of the instances of the system.

3. The system of claim 2, wherein each instance of the system further comprises:
   an auxiliary channel, coupled to or comprised in the receiver, wherein the signal further comprises auxiliary data, wherein the auxiliary data comprises non-video data, wherein the auxiliary channel is configured to send or receive the auxiliary data, wherein the auxiliary channel provides for communication between the system and the host computer; and a serial hub, coupled to the receiver via the auxiliary channel, wherein the serial hub is configured to provide serial I/O for one or more peripheral devices coupled to the serial hub;

wherein when the instances of the system are daisy chained, the instances implement a sequential tiered star topology, wherein a first video stream of the plurality of video streams is associated with the serial hub of the first instance of the system, and wherein successive video streams of the plurality of video streams are respectively associated with the serial hubs of the further instances of the system in a sequential manner, thereby associating each video stream with the one or more serial peripheral devices respectively coupled to each serial hub.

4. The system of claim 1, wherein the at least a remainder of the video streams comprises the plurality of video streams.

5. The system of claim 1, wherein the at least a remainder of the video streams comprises a subset of the plurality of video streams.

6. The system of claim 1, wherein the receiver comprises a high definition content protection (HDCP) engine that supports HDCP, wherein the receiver is configured to decrypt the plurality of video streams via the HDCP engine if content protection is enabled.

7. The system of claim 1, further comprising:
an auxiliary channel, coupled to or comprised in the receiver, wherein the signal further comprises auxiliary data, wherein the auxiliary data comprises non-video data, wherein the auxiliary channel is configured to send or receive the auxiliary data;
wherein the auxiliary channel provides for communication between the system and a host computer.

8. The system of claim 7, further comprising:
a serial hub, coupled to the receiver via the auxiliary channel, wherein the serial hub is configured to provide serial I/O for peripheral device or network communications.

9. The system of claim 8, wherein the receiver comprises:
a monitor management interface; and
a second mux/demux, coupled to the auxiliary channel, the monitor management interface, and the serial hub, and wherein the second mux/demux is configured to:
communicate the auxiliary data with the auxiliary channel, wherein the auxiliary data comprises serial I/O for peripheral devices and management information for one or more monitors, including first management information for the first monitor;
communicate the serial I/O for peripheral devices with the serial hub;
communicate the first management information with the monitor management interface, wherein the first management information comprises values for attributes of the first monitor;
wherein the monitor management interface is configured to:
communicate the first management information with the first monitor;
wherein the serial hub is configured to:
communicate the serial I/O for peripheral devices with the auxiliary channel and one or more peripheral devices coupled to the serial hub.

10. The system of claim 9, further comprising:
a third mux/demux, coupled to the second mux/demux and the serial hub, wherein the third mux/demux is configured to:
communicate the management information for one or more monitors with the second mux/demux and downstream devices coupled to the system;
communicate the serial I/O for peripheral devices with the serial hub and the downstream devices coupled to the system.

11. The system of claim 7, further comprising:
an audio codec, coupled to the serial hub, wherein the audio codec provides for communication of audio data with a microphone or speakers.

12. The system of claim 7, wherein the serial hub provides docking functions comprising one or more of:
audio functions;
functions for human interface devices (HIDs); or
functions for network communications.

13. The system of claim 7, wherein the system supports multiple monitors, docking functions, and protected content via a single cable.

14. The system of claim 1, further comprising:
the first monitor;
wherein the system implements a zero client.

15. The system of claim 1, wherein the transmit physical interface is configured to support a single HDMI/DVI port in lieu of multiple video streams.

16. The system of claim 1, wherein the system is comprised on a chip, wherein the system is coupled to a host computer and is useable to receive the plurality of video streams from a graphics processing unit (GPU) of the host computer.

17. The system of claim 1, wherein instances of the system are useable in respective daisy chained zero clients coupled to a host computer via a network.

18. The system of claim 1, wherein the system is implemented as an application specific integrated circuit (ASIC).

19. A method for displaying data on a monitor, comprising:
receiving, to a receiver on a circuit, a plurality of video streams, wherein each video stream comprises respective video data;
determining, via a first mux/demux on the circuit, which video stream of the plurality of video streams is to be displayed on the monitor;
routing the determined video stream to a low-voltage differential signaling (LVDS) converter on the circuit;
generating, via the LVDS converter, an LVDS signal based on the video data of the determined video stream, and sending the LVDS signal to an LVDS serializer/deserializer (SerDes) on the circuit, wherein the SerDes is configured to directly control a display panel of the monitor;
generating, via the LVDS SerDes, a display signal based on the LVDS signal, and sending the display signal to the display panel of the monitor;
routing, via the first mux/demux, a remainder of the video streams of the plurality of video streams to a transmitter on the circuit;
sending, via the transmitter, the remainder of the video streams to a transmit physical interface on the circuit;
transmitting, via the transmit physical interface, the remainder of the video streams as output, wherein the remainder of the video streams are useable as input to one or more additional monitors coupled to the monitor.

20. The method of claim 19, wherein the method is performed by a first instance of a circuit that is includable in or connectable to the first monitor, wherein further instances of the circuit are included in or connected to each of the one or more additional monitors, and wherein the instances of the circuit are daisy chained, the method further comprising:
   each instance of the circuit performing:
      receiving at least a subset of the plurality of video streams;
      extracting and displaying a video stream from the at least a subset of the plurality of video streams on a respective monitor; and
      transmitting at least a remainder of the at least a subset of the plurality of video streams as output to another of the instances of the circuit.

21. The method of claim 20, wherein each instance of the circuit further comprises:
   an auxiliary channel, coupled to or comprised in the receiver, wherein the signal further comprises auxiliary data, wherein the auxiliary data comprises non-video data, wherein the auxiliary channel is configured to send or receive the auxiliary data, wherein the auxiliary channel provides for communication between the circuit and a host computer; and
   a serial hub, coupled to the receiver via the auxiliary channel, wherein the serial hub is configured to provide serial I/O for one or more peripheral devices coupled to the serial hub;
   wherein the instances implement a sequential tiered star topology, wherein a first video stream of the plurality of video streams is associated with the serial hub of the first instance of the circuit, and wherein successive video streams of the plurality of video streams are respectively associated with the serial hubs of the further instances of the circuit in a sequential manner, thereby associating each video stream with the one or more serial peripheral devices respectively coupled to each serial hub.

22. The method of claim 20, wherein the instances of the circuit and the monitors comprise respective daisy chained zero clients coupled to a host computer via a network.

23. The method of claim 19, wherein the at least a remainder of the video streams comprises the plurality of video streams.

24. The method of claim 19, wherein the at least a remainder of the video streams comprises a subset of the plurality of video streams.

25. The method of claim 19, wherein the receiver comprises a high definition content protection (HDCP) engine that supports HDCP, the method further comprising:
   the receiver decrypting the plurality of video streams via the HDCP engine if content protection is enabled.

26. The method of claim 19, wherein the signal further comprises auxiliary data, wherein the auxiliary data comprises non-video data, the method further comprising:
   an auxiliary channel, coupled to or comprised in the receiver, sending or receiving the auxiliary data to a serial hub, coupled to the receiver via the auxiliary channel; and
   the serial hub providing serial I/O for peripheral device or network communications via the auxiliary channel.

27. The method of claim 26, wherein the auxiliary data comprises serial I/O for peripheral devices and management information for one or more monitors, including first management information for the monitor, the method further comprising:
   communicating, via a second mux/demux the auxiliary data with the auxiliary channel;
   communicating, via the second mux/demux, the serial I/O for peripheral devices with the serial hub;
   communicating, via the second mux/demux, the first management information with the monitor management interface, wherein the first management information comprises values for attributes of the monitor;
   communicating, via the monitor management interface, the first management information with the monitor; and
   communicating, via the serial hub, the serial I/O for peripheral devices with the auxiliary channel and one or more peripheral devices.

28. The method of claim 27, further comprising:
   communicating, via a third mux/demux, the management information for one or more monitors with the second mux/demux and one or more downstream devices; and
   communicating, via a third mux/demux, the serial I/O for peripheral devices with the serial hub and the one or more downstream devices.

29. The method of claim 26, further comprising:
   communicating, via an audio codec coupled to the serial hub, audio data with a microphone or speakers.

30. The method of claim 26, wherein the serial hub provides docking functions comprising one or more of:
   audio functions;
   functions for human interface devices (HIDs); or
   functions for network communications.

31. The method of claim 19, wherein said receiving comprises receiving the plurality of video streams from a graphics processing unit (GPU) of a host computer.

32. A system, comprising:
   two or more daisy chained monitors, each monitor respectively comprising or coupled to:
      a circuit, comprising:
         a receiver, configured to receive a signal comprising a plurality of video streams, wherein each video stream comprises respective video data;
         a first mux/demux, coupled to the receiver, wherein the first mux/demux is configured to determine which video stream of the plurality of video streams is to be displayed on the monitor;
         a low-voltage differential signaling (LVDS) converter, coupled to the first mux/demux, wherein the LVDS converter is configured to generate an LVDS signal based on the video data of the determined video stream;
         an LVDS serializer/deserializer (SerDes), coupled to the LVDS converter, wherein the SerDes is configured to generate a display signal based on the LVDS signal and send the display signal to a display panel of the monitor;
         a transmitter, coupled to the first mux/demux; and
         a transmit physical interface, coupled to the transmitter, wherein the first mux/demux is further configured to send at least a remainder of the video streams of the plurality of video streams to the transmitter, wherein the transmitter is configured to send the at least a remainder of the video streams to the transmit physical interface, and wherein the transmit physical interface is configured to transmit the at least a remainder of the video streams as output, wherein the at least a remainder of the video streams are useable as input to one or more additional monitors coupled to the respective monitor;
   wherein a first monitor of the two or more monitors is coupled to a computer, and wherein the circuit of the first monitor is configured to:
      receive the plurality of video streams from the computer;

extract and display a first video stream of the plurality of video streams; and transmit the at least a remainder of the plurality of video streams to a second monitor of the two or more monitors; and wherein the circuit of the second monitor is configured to:

receive the at least a remainder of the plurality of video streams from the circuit of the first monitor; and extract and display a second video stream of the plurality of video streams;

wherein the circuit of the second monitor is useable to transmit another at least a remainder of the plurality of video streams to respective circuits of one or more further monitors in a daisy chain manner.

33. The system of claim 32, wherein the two or more daisy chained monitors comprise a first monitor and at least one other monitor, wherein the circuit further comprises:

an auxiliary channel, coupled to or comprised in the receiver, wherein the signal further comprises auxiliary data, wherein the auxiliary data comprises non-video data, wherein the auxiliary channel is configured to send or receive the auxiliary data, wherein the auxiliary channel provides for communication between the monitor and the computer; and a serial hub, coupled to the receiver via the auxiliary channel, wherein the serial hub is configured to provide serial I/O for one or more peripheral devices coupled to the serial hub;

wherein the daisy chained monitors implement a sequential tiered star topology, wherein a first video stream of the plurality of video streams is associated with the serial hub of the first monitor, and wherein successive video streams of the plurality of video streams are respectively associated with the serial hubs of the at least one other monitor and any further daisy chained monitors in a sequential manner, thereby associating each video stream with the one or more serial peripheral devices respectively coupled to each serial hub.

* * * * *